UNITED STATES PATENT OFFICE.

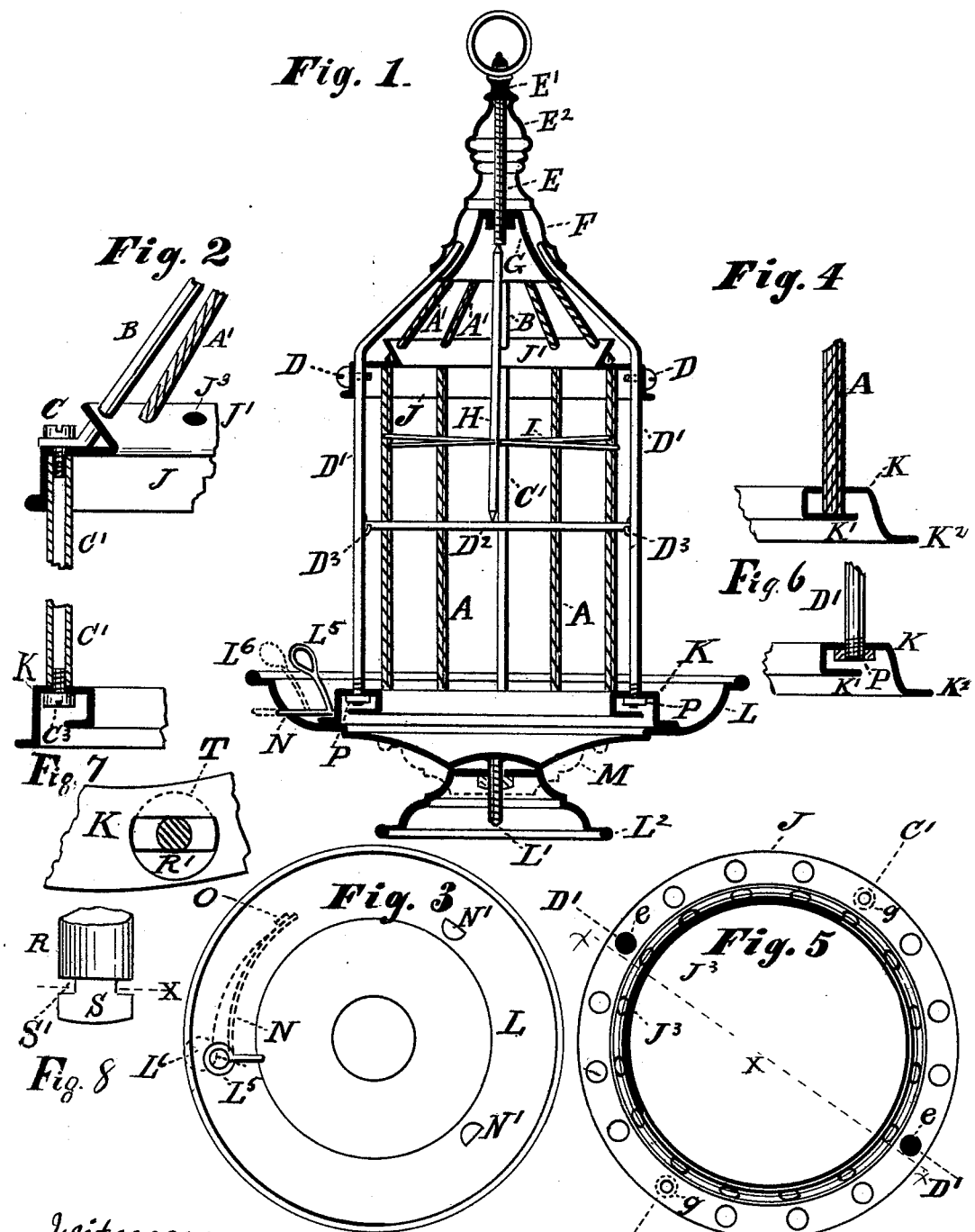

SIDNEY B. KING, OF BUFFALO, NEW YORK.

IMPROVEMENT IN BIRD-CAGES.

Specification forming part of Letters Patent No. 220,244, dated October 7, 1879; application filed November 29, 1878.

*To all whom it may concern:*

Be it known that I, SIDNEY B. KING, of Buffalo, in the county of Erie and State of New York, have invented certain new and useful Improvements in Bird-Cages, which improvements are fully set forth in the following specification and accompanying drawings, in which—

Figure 1 is a vertical section through the cage through line $x$, Fig. 5; Fig. 2, an enlarged view, in section, of a portion of the upper part of the frame, also a portion of the lower frame-rim K; Fig. 3, a plan view of the bottom; Fig. 4, an enlarged view of a portion of the lower frame-rim, showing the mode of supporting the glass rods in said rim. Fig. 5 is a top view of the upper frame-rim, showing a horizontal section through the bars $D^1$ and the tops of the bars $C^1$ in dotted lines. Fig. 6 represents a portion of the same rim in section, showing the mode of securing the frame-rods thereto. Figs. 7 and 8 represent a modified way of fastening the cage-frame rods.

This invention relates to that class of cages having removable parts, which can be easily put together or taken apart for convenience in packing and transportation, and is an improvement on the invention for which Letters Patent No. 186,937 were granted to me February 6, 1877; and it consists in the construction and mode of fastening the frame-rods to the upper and lower rims; also, in a lower frame-rim perforated to receive the lower ends of the bars, and provided with an inwardly-projecting flange to support them, and an outwardly-projecting flange to which the bottom is connected; also, in an upper perforated frame-rim provided with an upwardly-projecting perforated flaring rim, for purposes which will more clearly hereinafter appear.

My invention further consists of a rod arranged to rotate easily, and set so as to incline a little from the perpendicular, in combination with a suitable supporting device, the arrangement being such that the weight of the bird causes the perches to turn, as will be more clearly hereinafter shown by reference to the drawings, in which—

A A' represent the corrugated glass bars or rods; B $C^1$ $D^1$, the supporting-bars for holding the top and bottom rims J and K in position.

The rods $D^1$ are arranged one on each side of the cage, (see Fig. 1,) and are bent near the top, as shown, and passed through holes in the upper rim J at the points marked $e$ in Fig. 5; to which rim they are securely fastened near the bends by screws D, the lower ends being fastened to the lower rim K by nuts P, and the ends at the top fastened between the outer sides of the bell-shaped piece G and the inner sides of the top F by means of the screw E and nut in the bell-top F, the top part $E^1$, to which the screw E is rigidly fastened, being arranged to turn on the top of $E^2$. Two more of such frame-pieces, $C^1$, are arranged opposite each other, and fastened through holes in the rim J at the points marked $g$ $g$. (See Fig. 5.) These holes should be made smaller than the rods $C^1$, so that the upper ends will be held tightly by the screw C, which draws it up against the under side of the rim J, thereby holding it rigid. This part of the frame is made in two parts, as seen in Fig. 2, B being the rod for securing the upper part of the cage, the top end of which is fastened by the bell-shaped piece G, as before mentioned, and the lower end (which passes through a hole in the flange $J^1$ of the rim J) by a screw, C, screwing into the end of a tubular rod, $C^1$. The rod $C^1$ is secured in a similar way to the bottom rim, K, by a screw, $C^3$. (See Fig. 2.) The bars A are secured in place by passing them down through the holes in the rim J and into corresponding holes in the rim K, where they rest on the inwardly-projecting flange $K^1$. The rim or annular ring and flange $K^1$ are spun in the lathe, or otherwise formed all in one piece, which makes a cheaper, better, and stronger device for the purpose.

If desired, the rods A may be fastened at the bottom, as shown in Figs. 7 and 8, by a portion of the rim K being turned to form a flange-catch to hold the button S of the lower extremity of the rods, R being the lower part of the rod. The hole R' in the rim is in the form of a little more than a half-circle, and the bottom S of rod R is made to correspond with it.

S' is a groove surrounding the bottom of the rod, so that when it enters the hole and is turned half-way round, the round portion (see dotted lines T) will be under the straight side of the hole, as shown, and thereby hold it in position securely. The part of the rod shown in said hole is a section through line X.

The upper rods A' are secured in place by passing the lower end through the holes J³, (see Figs. 1 and 5,) and the upper ends are secured by the bell-shaped piece G and the inner side of F, as before mentioned. (See Fig. 1.) The upper rim, J, and its projecting flange J¹ are formed of one piece of sheet metal to insure durability and cheapness.

H represents a nearly-vertical rod, secured at the top by a depression in the bottom of the screw E, and at the bottom by a depression in the cross-bar D², which is held to the bars D¹ by the hooks D³, the rod H being thus held so as to turn easily. Two or more perches, I, are secured to the rod H, which is inclined just enough from the perpendicular to allow the weight of a bird to turn it when on a perch in its highest position.

L represents the bottom. It is composed of the pieces L L². At the bottom of L is rigidly fastened a screw, L¹, and L² is provided with a nut to fit it, so that it can be screwed on in the position shown in Fig. 1, or reversed and fastened on in the position shown at M by the dotted lines, Fig. 1, when the cage is intended to be hung up. Its position, as shown by the dotted lines M, leaves a part of the screw L¹ projecting, so that any suitable ornament may be screwed onto it.

N represents a spring, fastened to the outside of the bottom L by a rivet, O, or its equivalent. (See dotted lines, Fig. 3.) It may be made either of wire or sheet metal, and is a side spring having the thumb-piece projecting up through the bottom L, as shown in Figs. 1 and 3, the dotted lines L⁶ showing its position when sprung out. The letters N' represent pieces which project over or forward on top of bottom L toward the center, as shown, for holding the cage and bottom together. The bottom is readily put on or attached to the cage by pushing the spring outward and slipping the edge of the flange K² (which is made in one piece with K K¹) under the lips or projections N', of which there may be one or more, and letting the spring move over said flange, as shown in Fig. 1.

The corrugated glass bars are ornamented, and add greatly to the appearance of the cage. They are easily cleaned when required, are not liable to corrode or fade, and when cleaned always appear just as good as new.

If desired, the bars A may be combined with removable metallic bars arranged alternately without changing the nature of my invention. With such an arrangement the metal should be passed down through the holes in the upper frame-rim, and the lower ends fastened by slipping into the holes R' and turning them partly around, as hereinbefore mentioned; but I prefer a less number of the metal bars and more of the glass bars, as it improves the appearance of the cage, and four metal bars afford a frame of sufficient strength for connecting and supporting the upper and lower frame-rims for the glass bars.

It will be readily seen that the bars B C¹ may be made in one piece, and bent and fastened in a manner similar or equivalent to rods D¹, and that the rims J¹ and K may be made in either one or more pieces, without changing the nature of this invention.

I claim as my invention—

1. In a bird-cage composed of separate parts, the bent frame-rods D¹, fastened to the lower and upper rims by nuts P and screws D, and to the top, substantially as specified, in combination with the rods B C¹, connected as described, and the removable corrugated glass bars A A', as and for the purposes set forth.

2. The annular rim K, perforated to receive the lower ends of the bars A, substantially as specified, and having the inwardly-projecting flange K¹ and outwardly-projecting flange K², substantially as and for the purposes specified.

3. The upper perforated rim J, provided with the upwardly-projecting flaring rim J¹, for the purpose of holding the bars A and A', substantially as described.

4. The revolving rod H, set so as to incline a little from a vertical line, as specified, in combination with the perches I and a suitable supporting device, substantially as described.

SIDNEY B. KING.

Witnesses:
JAMES SANGSTER,
HUGH SANGSTER.